United States Patent [19]

Lin et al.

[11] Patent Number: 5,420,692

[45] Date of Patent: May 30, 1995

[54] METHOD AND APPARATUS FOR ENCODING A FACSIMILE MESSAGE

[75] Inventors: Jyh-Han Lin, Boynton Beach; Noah P. Orlen, Boca Raton, both of Fla.

[73] Assignee: Motorola, Inc., Schaumburg, Ill.

[21] Appl. No.: 254,860

[22] Filed: Jun. 6, 1994

[51] Int. Cl.[6] .................... H04N 1/41; H04N 1/415
[52] U.S. Cl. .................... 358/426; 358/432; 358/433; 358/261.3
[58] Field of Search ............ 358/426, 432, 433, 261.3, 358/430, 261.2, 428; 348/390, 409, 420, 403, 404; 382/56

[56] References Cited

U.S. PATENT DOCUMENTS

| | | | |
|---|---|---|---|
| 3,804,975 | 4/1974 | Abe | 358/432 |
| 4,173,771 | 11/1979 | Iijima | 348/409 |
| 4,589,144 | 5/1986 | Namba . | |
| 4,897,733 | 1/1990 | Sakaguchi et al. | 358/433 |
| 4,920,427 | 4/1990 | Hirata . | |
| 4,924,521 | 5/1990 | Dinan et al. | 382/56 |
| 5,189,526 | 2/1993 | Sasson | 358/432 |

Primary Examiner—Scott A. Rogers
Attorney, Agent, or Firm—James A. Lamb

[57] ABSTRACT

A decoder for decoding a target image from a signal. The signal includes S facsimile encoded sub-image messages transmitted in a predetermined order. The decoder also stores a runlength code book. The decoder includes a facsimile decoder (910), a sub-image memory (920), a target image generator (940), and a target image memory (930). The facsimile decoder (910) is for generating S sub-images from the S facsimile encoded sub-image messages, using the runlength code book. Each of the S sub-images includes sub-image lines includes pixels. The sub-image memory (920) is for storing the S sub-images. The target image generator (940) is for re-assembling the target image from the S sub-images. The target image memory (930) is for storing the target image.

32 Claims, 12 Drawing Sheets

METHOD AND APPARATUS FOR ENCODING A FACSIMILE MESSAGE

FIELD OF THE INVENTION

This invention relates in general to transmitting facsimile image messages, and in particular to a method for transmitting and receiving an image having a high resolution using a code book developed for images having a lower resolution.

BACKGROUND OF THE INVENTION

Selective call radio communication systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information having an address and possibly a data or voice message. When the selective call receiver detects its address, it typically alerts the user and presents any received information.

Contemporary selective call radio communication systems such as paging systems employ messaging schemes that can deliver a voice, numeric, or alphanumeric messages to a user. The majority of paging systems transmit address and message information using a protocol such as the GSC (Golay Sequential Code) or POCSAG (Post Office Code Standardization Advisory Group) code. These protocol formats are well known to one of ordinary skill in the art of selective call communication systems. To originate a message or page, the base station or a system controller is typically accessed via the PSTN from a rotary or dual-tone-multi-frequency (DTMF) telephone. As a voice message entry device, the telephone is acceptable, but when graphical information or data needs to be entered, an alternative means of entry is required. Alternative entry devices such as computer terminals and custom entry devices work well when the originators can convey their information to the user in a concise, alphanumeric character based format. However, customer acceptance of these alternative entry devices has been lacking for reasons of expense and operational complexity, particularly in generating and encoding graphics. Facsimile machines are more universally accepted by originators because of their simplicity of operation and their ability to accept almost any paper document, including documents having graphic images.

Selective call receiving devices such as pagers, personal digital assistants, and mobile data terminals are available which receive and display text messages, and some of these devices also can receive facsimile messages and display graphical images. Display screens on such devices, particularly portable devices, are typically physically small in comparison to a normal sheet of paper (e.g., 8.5 inches by 11 inches in the United States). Furthermore, the display screens of some devices are designed having lower image resolution than that used in office facsimile machines. A combination of smaller screen size and lower image resolution results in a reduction of the amount of electronics needed for row and column driving of such displays, the amount of memory needed for storing an image, and the size of a code book required to decode a received message, achieving a smaller and less expensive device, and in the case of portable devices, a device which has longer battery life. The size of the code book is smaller because the size is directly related to the image resolution for which the code book is designed. This works well for messages directed to such devices because not nearly as much information is needed by the users of such devices for a large majority of received messages.

Circumstances arise, however, in which it is desirable to encode, for transmission to a receiver, a target image which has a higher resolution than that for which the code book in the receiver was designed. Thus, what is needed is a means and a method for encoding and decoding a facsimile message having a high resolution using a code book developed for images having a lower resolution.

SUMMARY OF THE INVENTION

In a first aspect of the invention, a method is for use in a controller for generating and transmitting a target image to a receiver. The target image is facsimile encoded and includes target image lines consisting of pixels, and the target image lines have a resolution, T. The resolution, T, is greater than a predetermined resolution, C, for which a runlength code book stored in the receiver is optimized. The method includes the steps of computing a number, S, dis-assembling the target image, and encoding each of the S sub-images. In the step of computing a number, S, the number of sub-images, S, is computed from an interleaving ratio, T/C. In the step of dis-assembling, the target image is dis-assembled into S sub-images consisting of sub-image lines. In the step of encoding each of the S sub-images is encoded into one of S facsimile sub-image messages using a runlength code book. The runlength code book is identical to the runlength code book stored in the receiver.

In a second aspect of the invention, an image encoder includes a ratio calculator, an image dis-assembler, a sub-image memory, and a facsimile message encoder. The image encoder generates and transmits a facsimile encoded target image to a receiver. The target image includes lines consisting of pixels stored in a target image memory. The lines have a resolution, T, which is greater than a predetermined resolution, C. A runlength code book stored in the receiver is optimized for the predetermined resolution, C. The image encoder includes a ratio calculator, an image dis-assembler, a sub-image memory, and a facsimile message encoder. The ratio calculator is for computing a number of sub-images, S, from a interleaving ratio, T/C, which is a ratio of the resolution, T, of the lines of the target image to the predetermined resolution, C, of the runlength code book stored in the receiver. The image dis-assembler is coupled to the ratio calculator and the target image memory and is for dis-assembling the target image into S sub-images, wherein S is a positive integer. The sub-image memory is coupled to the image dis-assembler and is for storing the S sub-images. The facsimile message encoder is coupled to the sub-image memory and is for encoding each of the S sub-images into a facsimile sub-image message, using a runlength code book identical to the runlength code book stored in the receiver.

In a third aspect of the invention, a system controller generates and transmits a digital radio signal which includes a facsimile encoded target image to a selective call receiver. The target image includes lines consisting of pixels stored in a target image memory, and the lines have a resolution, T, which is greater than a predetermined resolution, C, of a runlength code book stored in the selective call receiver. The system controller includes a ratio calculator, an image dis-assembler, a sub-image memory, a facsimile message encoder, and a transmitter. The ratio calculator is for computing a number of sub-images, S, from a interleaving ratio, T/C, which is a ratio of the resolution, T, of the lines of the target image to the resolution, C, of the runlength code book stored in the selective call receiver. The image dis-assembler is coupled to the ratio calculator and to the target image memory and is for dis-assembling the target image into S sub-images, wherein S is a positive integer. The sub-image memory is coupled to the sub-image generator and is for storing the S sub-images. The facsimile message encoder is coupled to the sub-image memory and is for encoding each of the S sub-images into a facsimile sub-image message, using a runlength code book identical to the runlength code book stored in the receiver. The transmitter is coupled to the facsimile message encoder and is for transmitting the S encoded facsimile sub-image messages and the target resolution, T, to the selective call receiver within the digital radio signal.

The image dis-assembler includes a line selector, a pixel group calculator, a pixel group selector, and a sub-image generator. The line selector is for selecting, from top to bottom, each line of the target image. The pixel group calculator is coupled to the ratio calculator and is for calculating groups of contiguous pixels in each target image line by assigning a group number to each pixel. Each group of contiguous pixels consists of pixels assigned the same group number. The group number is an integer ceiling of a quotient of an ordinal position of each pixel and the interleaving ratio, T/C. The pixel group selector is coupled to the line selector and the pixel group calculator and is for selecting, from left to right, each of the ordered group of contiguous pixels in the selected line of the target image. The sub-image generator is coupled to the pixel group selector, the pixel group calculator, the line selector, and to the target image memory, and is for copying each unique pixel to a different one of a predetermined S-1 of the S sub-image lines when the selected group consists of S-1 pixels. The sub-image generator also copies each unique pixel to a different one of the S sub-image lines when the selected group includes S pixels.

In a fourth aspect of the invention, a method is for use in a receiver for decoding a target image from a signal. The receiver stores a runlength code book optimized to a predetermined resolution C. The method includes the steps of receiving, generating, re-assembling a target image line, and re-assembling the target image. In the step of receiving, S facsimile encoded sub-image messages included in the signal are received, in which each facsimile encoded sub-image message includes a plurality of encoded sub-image lines, and in which the S facsimile encoded sub-image messages are in a predetermined order. In the step of generating, S sub-images are generated from the S facsimile encoded sub-image messages, using the runlength code book. Each of the S sub-images includes a plurality of sub-image lines consisting of pixels. In the step of re-assembling a target image line, the target image line includes pixels re-assembled from one of the plurality of sub-image lines from each of the S sub-images. In the step of re-assembling the target image, the target image is re-assembled by repeating the step of re-assembling a target image line, in a first predetermined order.

In a fifth aspect of the invention a decoder is for decoding a target image from a signal. The signal includes S facsimile encoded sub-image messages transmitted in a predetermined order. The decoder stores a runlength code book optimized to a predetermined resolution, C. The decoder includes a facsimile decoder, a sub-image memory, a target image generator, and a target image memory. The facsimile decoder is for generating S sub-images from the S facsimile encoded sub-image messages. Each of the S sub-images includes sub-image lines consisting of pixels, using the runlength code book. The sub-image memory is coupled to the facsimile decoder and is for storing the S sub-images. The target image generator is coupled to the sub-image memory and the facsimile decoder and is for re-assembling the target image from the S sub-images. The target image memory is coupled to the target image generator and is for storing the target image.

In a sixth aspect of the present invention a selective call receiver is for decoding a target image from information included in a digital radio signal. The selective call receiver stores a runlength code book optimized to a predetermined resolution C. The selective call receiver includes a receiver element, a controller, and a display. The receiver element is for receiving and demodulating the information in the received digital radio signal, including an address and S facsimile encoded sub-image messages transmitted in a predetermined order. The controller is coupled to the receiver element. The controller is for comparing the address with a predetermined address stored in the selective call receiver and is for further processing the information when the address compares to the predetermined address. The controller includes a facsimile decoder, a sub-image memory, a target image generator, and a target image memory. The facsimile decoder is for generating S sub-images from the S facsimile encoded sub-image messages, using the runlength code book. Each of the S sub-images includes sub-image lines comprising pixels. The sub-image memory is coupled to the facsimile decoder and is for storing the S sub-images. The target image generator is coupled to the sub-image memory and the facsimile decoder, and is for re-assembling the target image from the S sub-images. The target image memory is coupled to the target image generator and is for storing the target image. The display is coupled to the target image memory and is for displaying the target image.

DETAILED DESCRIPTION OF THE INVENTION

Figure 1:
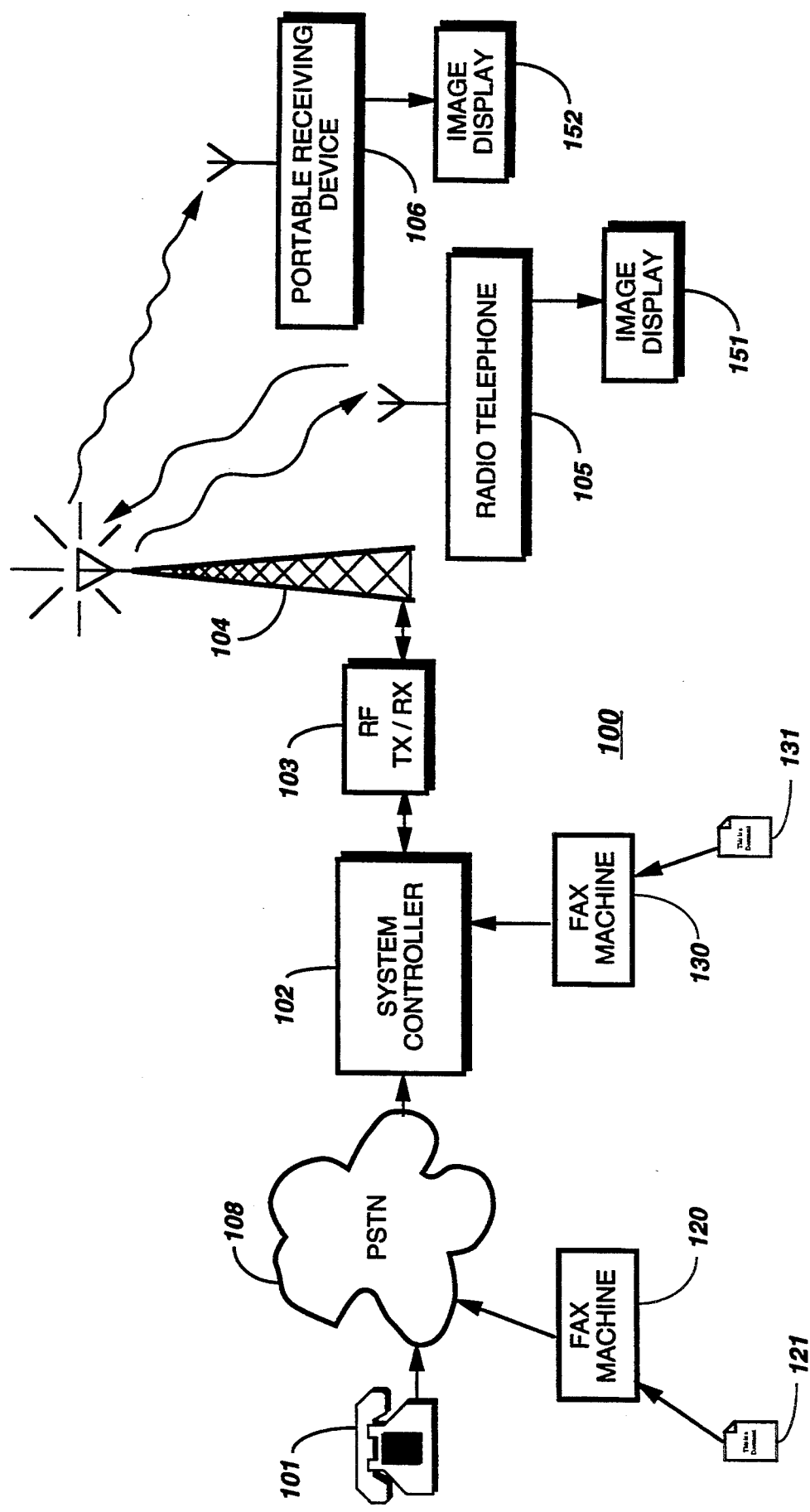
FIG. 1 is an electrical block diagram of a radio communication system in accordance with a preferred embodiment of the present invention.

Referring to FIG. 1, an electrical block diagram of a radio communication system 100 is shown in accordance with the preferred embodiment of the present invention. The radio communication system 100 comprises message input devices, such as a telephone 101 and a facsimile machine 120 connected by a conventional public switched telephone network (PSTN) 108 to a system controller 102, and a facsimile machine 130 connected directly by a cable to the system controller 102. The facsimile machines optically scan documents 121 and 131, encode the optical image into standard CCITT (The International Telegraph and Telephone Consultative Committee) group 3 or group 4 facsimile messages which are then coupled to the system controller 102. The system controller 102 oversees the operation of a radio frequency transmitter/receiver 103 and encodes and decodes inbound and outbound telephone addresses into formats that are compatible with land line message switch computers and personal radio telephone addressing requirements, such as cellular message protocols. The system controller 102 can also function to encode paging messages for transmission by the radio frequency transmitter/receiver 103. The system controller 102 can further function to receive a standard group 3 or group 4 facsimile message and encode the message as described below for transmission by the radio frequency transmitter/receiver 103. Telephony signals, facsimile messages, and data messages are transmitted from and received by at least one antenna 104 coupled to the radio frequency transmitter/receiver 103. The telephony signals and facsimile messages are transmitted to a communication receiver, such as a personal radio telephone 105. The personal radio telephone 105 is capable of decoding a facsimile message and is coupled to an image display 151 for displaying the images of documents 121 and 131. The radio frequency transmitter/receiver 103 may also be used to transmit data paging messages and facsimile messages to portable receiving device 106. The portable receiving device 106 is capable of decoding the facsimile message and is coupled to an image display 152 for displaying the images of documents 121 and 131.

It should be appreciated that the PSTN 108 could alternatively be a Integrated Services Digital Network (ISDN) or other digital network, such as Internet.

It will be appreciated that other selective call radio terminal devices (not shown in FIG. 1), such as mobile cellular telephones, mobile radio data terminals, mobile cellular telephones having attached data terminals, or mobile radios (conventional and trunked) having data terminals attached, are also able to be used in the communication system 100. In the following description, the term "selective call receiver" will be used to refer to the personal radio telephone 105, or the portable receiving device 106, a mobile cellular telephone, a mobile radio data terminal, a mobile cellular telephone having an attached data terminal, or a mobile radio (conventional or trunked) having a data terminal attached. Each of the selective call receivers assigned for use in the communication system 100 has an address assigned thereto which is unique within the communication system 100. The address enables the transmission of a message from the system controller 102 only to the addressed selective call receiver, and identifies messages and responses received at the system controller 102 from the selective call receiver. Furthermore, each of one or more of the selective call receivers also has a unique telephone number assigned thereto, the telephone number being unique within the PSTN 108. A list of the assigned addresses and correlated telephone numbers for the selective call receivers is stored in the system controller 102 in the form of a subscriber data base.

It should be noted that the system controller 102 is capable of operating in a distributed transmission control environment that allows mixing cellular, simulcast, master/slave, or other coverage schemes for providing reliable radio signals within a geographic area as large as a nationwide network. Moreover, as one of ordinary skill in the art would recognize, the telephonic and radio communication functions may reside in separate system controllers that operate either independently or in a networked fashion.

Figure 2:
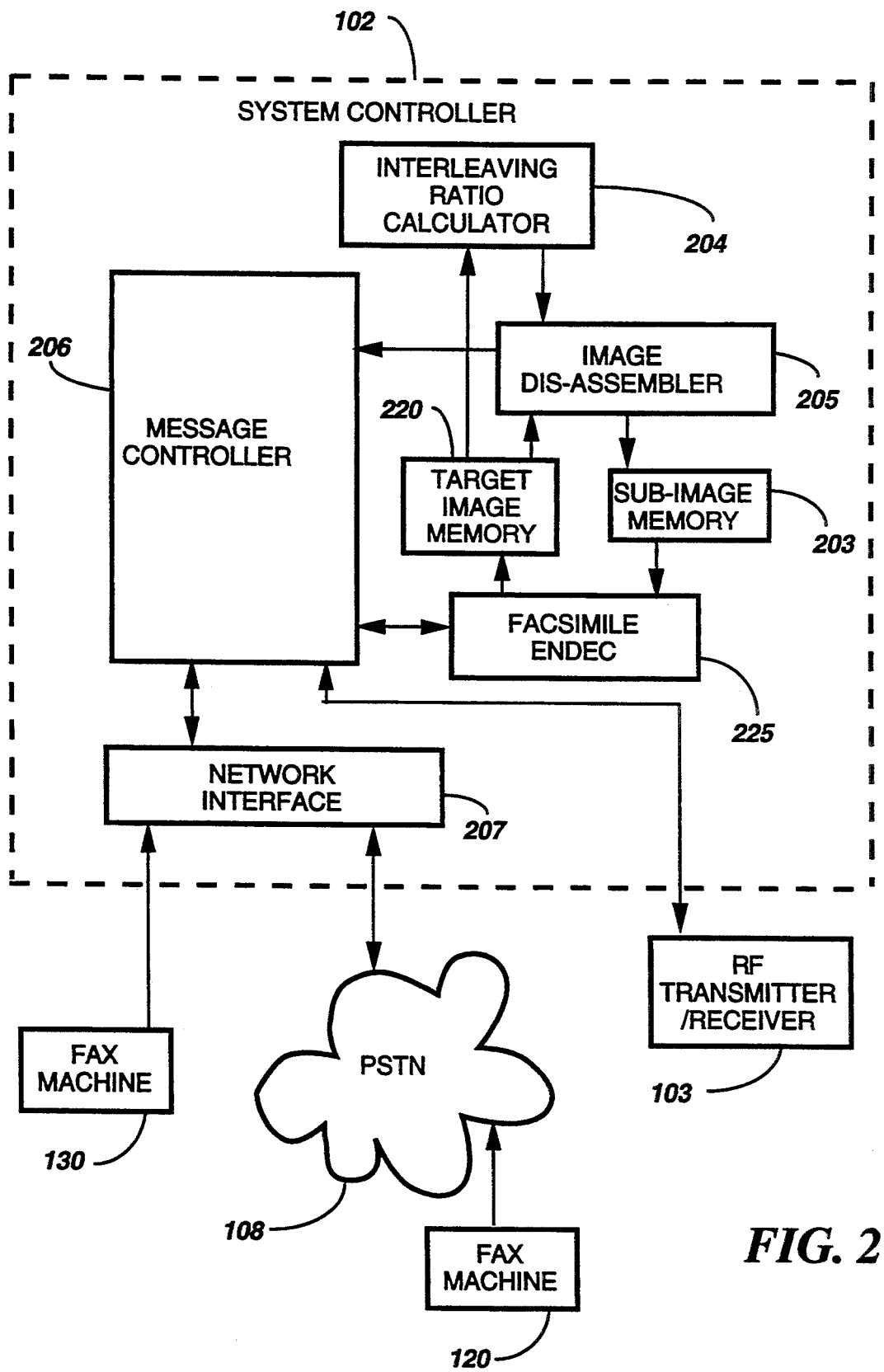
FIG. 2 is an electrical block diagram of the system controller, for use in the radio communication system of FIG. 1, in accordance with the preferred embodiment of the present invention.

The source document 121 as shown in FIG. 1 is read (scanned) by the facsimile machine 120, which quantizes the image into picture elements and encodes a CCITT (Consultative Committee on International Telegraph and Telephone) group 3 or group 4 facsimile message for transmission to the system controller 102. The facsimile machine 120 need not be located at the same physical site as the system controller 102, and in fact can be replaced by a number of devices such as a computer, a conventional document scanner, or possibly a dedicated message entry device, each being capable of communicating at least a facsimile message to the system controller 102 via the PSTN 108. Alternatively, a document 131 is read by the facsimile machine 130, as shown in FIG. 1, which transmits a CCITT group 3 or group 4 message and which is connected to the system controller 102 as shown in FIG. 2, through a high speed local data network, or a direct cable connection. The system controller 102 operates to receive CCITT group 3 and group 4 facsimile transmissions originated from the facsimile machines 130 or 120, and associates each facsimile message with at least one selective call address selected by an originator. Three originator entry modes of facsimile information for transmission to the personal radio telephone 105 and the portable receiving device 106 follow.

In a first entry mode, an originator wanting to send a facsimile to the facsimile capable personal radio telephone 105 or portable receiving device 106 (hereinafter called the subscriber device 105 or 106) calls the subscriber device's service provider using a conventional telephone and enters the subscriber device's code number or phone number (these numbers are assigned by the service provider to correspond to the actual coded addresses of the subscriber device 105 or 106), from a telephone key pad. The service provider maintains a list of facsimile capable code and phone numbers, and upon receiving an entered code or phone number which matches one of the facsimile capable code or phone numbers initiates a procedure to receive a conventional facsimile message through the PSTN 108. The originator then puts the conventional facsimile machine 120 into an on-line mode and transmits a document to the system controller 102. After receipt of the facsimile message, the system controller 102 encodes and transmits a data message to the targeted subscriber device. The method, protocol, and apparatus required for the transmission of the data message will be discussed in detail below.

In a second entry mode, an originator wanting to send a facsimile to a subscriber device uses a conventional facsimile machine that has a feature allowing the storage of a list of predetermined service provider phone numbers and subscriber code or phone numbers. In this entry mode, a facsimile message is originated by recalling the phone number of the service provider and the code or phone number of the subscriber from a memory in the originating facsimile machine. The facsimile machine dials the phone number of the service provider, thereby establishing a connection with the service. The subscriber device's code number is represented by an alias or nickname that points to a predetermined memory location in the facsimile machine containing the code or phone number of the subscriber. After successfully connecting with the service provider, the facsimile machine transmits the code or phone number of the subscriber device. When this is successfully completed, the facsimile machine transmits the document to the system controller 102.

In a third entry mode, the facsimile machine 130 is closely coupled to the system controller 102 as shown in FIG. 1 and FIG. 2. This entry mode includes all the capabilities discussed above and further improves on their performance by not requiring the PSTN 108 to originate a facsimile transmission. In this entry mode, the facsimile message input machine 130 can be directly connected to the system controller 102 via a high speed network (e.g., per Electronics Industry Association (EIA) specification RS-232, Institute of Electrical and Electronic Engineers (IEEE) Standard 802.3, or the like), thus resulting in extremely high message throughput.

Referring to FIG. 2, an electrical block diagram of the system controller 102 is shown, for use in the communication system 100 of FIG. 1, in accordance with the preferred embodiment of the present invention. The system controller 102 comprises a network interface 207, a message controller 206, a facsimile endec (encoder/decoder) 225, a target image memory 220, a sub-image memory 203, an image dis-assembler 205 and an interleaving ratio calculator 204. The network interface 207 is coupled to at least the facsimile machine 130 and the Public Switched Telephone Network (PSTN) 108 for the receipt of facsimile messages, and may be connected to other serial devices (not shown). The network interface 207 is also coupled to the message controller 206 which routes the facsimile messages within the system controller 102 to accomplish sub-image encoding of a portion of the facsimile messages received via the network interface 207 and to accomplish the transmission of the sub-image encoded messages to one or more selective call receivers. The message controller 206 is coupled to the radio frequency transmitter/receiver 103 for the communication of facsimile messages to the selective call receivers, as well as the communication of voice and data messages to and from to the selective call receivers. The message controller 206 is further coupled to the facsimile endec 225 for the decoding of a facsimile message into a target optical image. The facsimile endec 225 device is coupled to the target image memory 220 which stores the target optical image being encoded for facsimile transmission. The target image memory 220 is coupled to the image dis-assembler 205 which dis-assembles the target image into multiple sub-images using a standard CCITT group 3 or group 4 runlength code book in a manner which is described more fully below. The target image memory 220 is also coupled to the interleaving ratio calculator 204 which determines an interleaving ratio and the number of sub-images needed to perform the target image disassembly. The image dis-assembler 205 is further coupled to the interleaving ratio calculator 204, from which the interleaving ratio and the number of sub-images is received, and to the sub-image memory 203, for storing the multiple sub-images. The message controller 206 controls the facsimile endec 225 to encode the sub-images which are stored in the sub-image memory 203, and transmits the encoded sub-images to the one or more selective call receivers via the RF transmitter/receiver 103 in a digital radio signal. The message controller 206 is further coupled to the image dis-assembler 205, to receive parametric information therefrom. In summary, the system controller 102 receives a facsimile message which includes a target image and an indication of one or more of the selective call receivers which are to receive the image. The system controller 102 dis-assembles the target image into multiple sub-images which are transmitted to the indicated selective call receivers.

Figure 3:
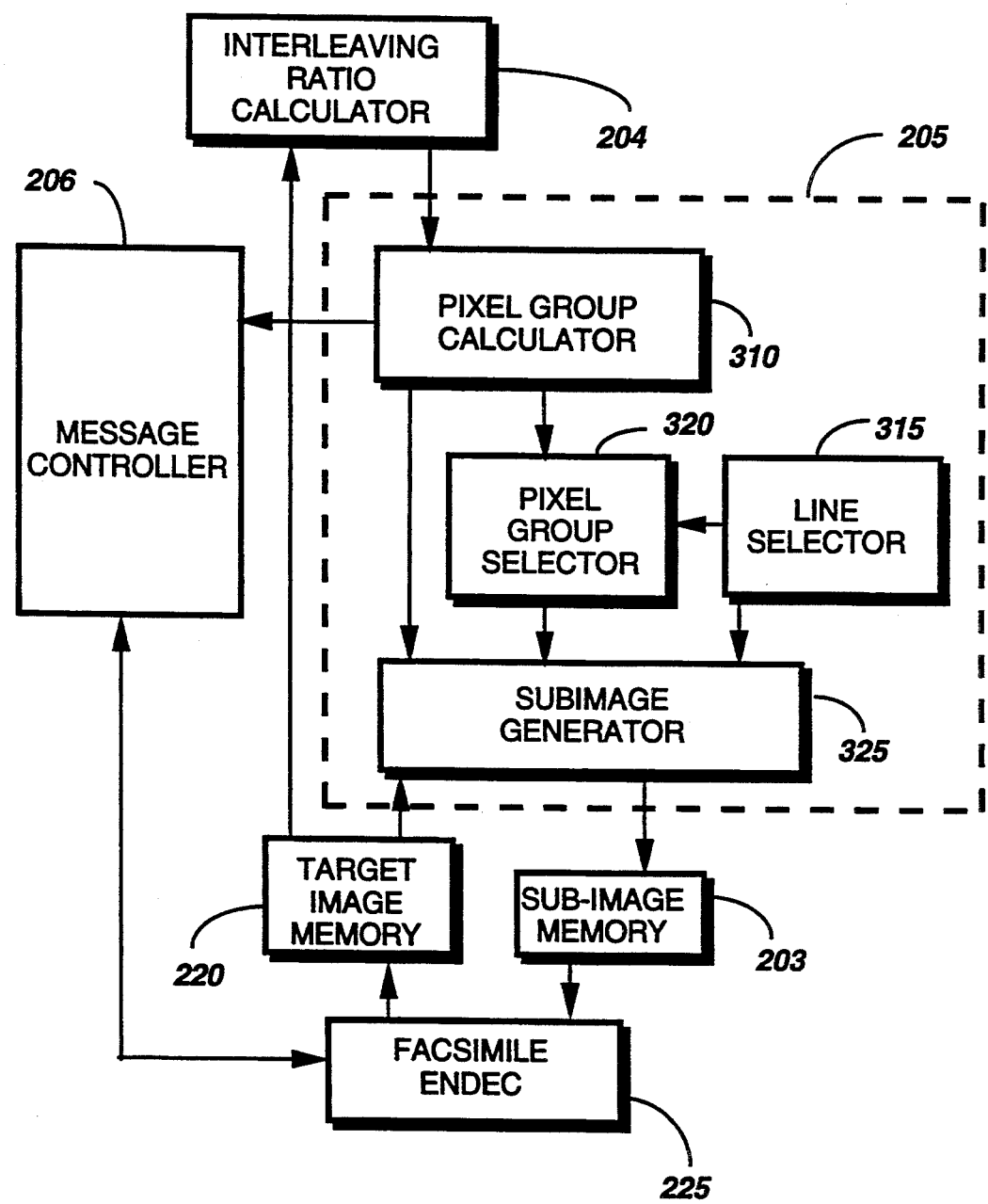
FIG. 3 is an electrical block diagram of a portion of the system controller of FIG. 2, which shows an image dis-assembler electrical block in detail, in accordance with the preferred embodiment of the present invention.
Figure 4:
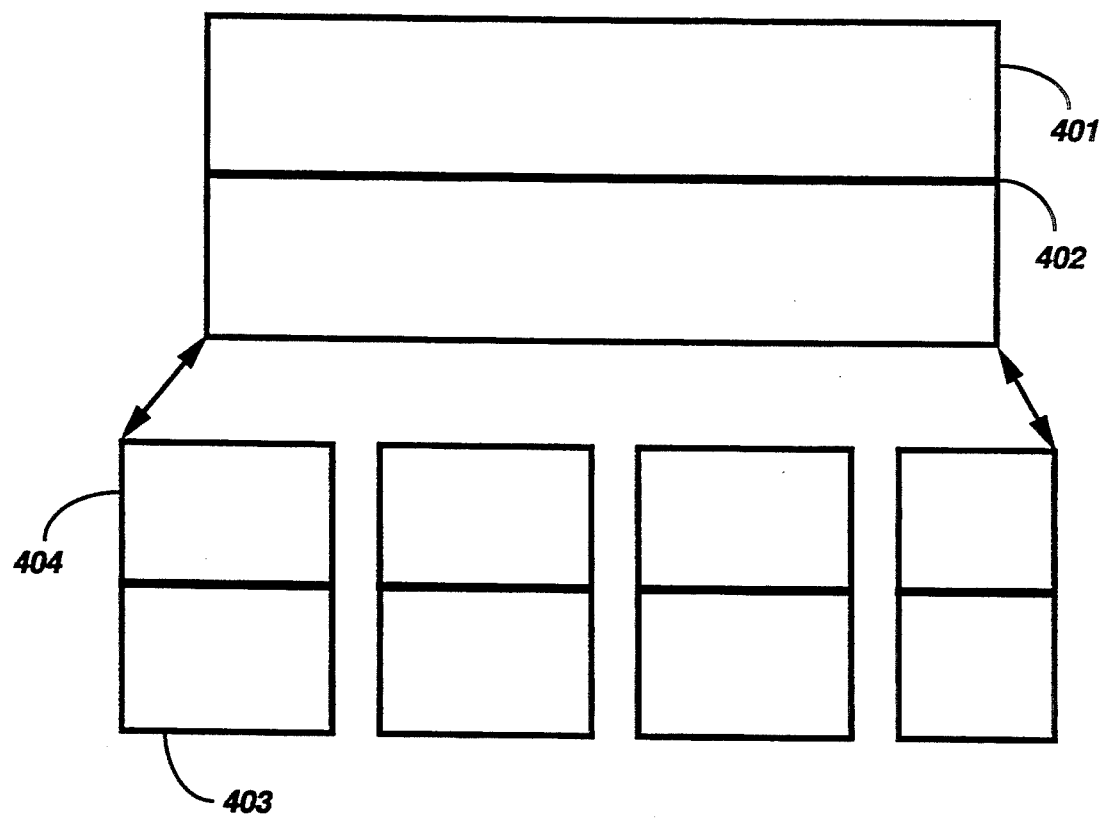
FIG. 4 is an illustration of multiple sub-images generated from a target image of a document by the system controller used in the radio communication system of FIG. 1, in accordance with the preferred embodiment of the present invention.

Referring to FIG. 3, an electrical block diagram of a portion of the system controller 102 of FIG. 4 shows the image dis-assembler electrical block 205 in detail, in accordance with the preferred embodiment of the present invention. The image dis-assembler 205 comprises a pixel group calculator 310, a pixel group selector 320, a line selector 315, and a sub-image generator 325. The pixel group calculator 310, which is coupled to the sub-image generator 325, determines sizes and locations of groups of contiguous pixels in a horizontal line of the target image, based on the interleaving ratio and number of sub-images determined by and coupled from the interleaving ratio calculator 204. The line selector 315, which is coupled to the sub-image generator 325 and the pixel group selector 320, selects a horizontal line of the target image and the sub-image for encoding. The pixel group selector 320 is coupled to the pixel group calculator 310 and selects, for encoding, one of the groups of pixels within the horizontal line of the target image which has been determined by the pixel group calculator 310. The sub-image generator 325, which is coupled to the interleaving ratio calculator 204, the pixel group selector 320, the line selector 315, the target image memory 220, and the sub-image memory 325, uses the number of sub-images, the pixel group, and the line number to interleave the group of pixels in a selected horizontal line of the target image to into portions of horizontal lines of the sub-images and stores the portions of horizontal lines of sub-images in the sub-image memory 203. The pixel group calculator 310 is coupled to the message controller for supplying parametric information thereto.

The system controller 102 is preferably a model E09-PED0552 PageBridge ® paging terminal manufactured by Motorola, Inc., of Schaumburg Ill., modified with special firmware elements in accordance with a preferred embodiment of the present invention, as will be described below. The network interface 207 (shown in FIG. 2), the message controller 206, the facsimile endec 225, the target image memory 220, the image dis-assembler 205, the sub-image memory 203, and the interleaving ratio calculator 204 are preferably implemented within portions of the model E09PED0552 PageBridge ® paging terminal which include, but are not limited to those portions providing a program memory, a central processing unit, input/output peripherals, and a random access memory. The system controller alternatively could be a MPS2000 ® paging terminal or other messaging system communication control computer.

When a message is received from the network interface 207, the message controller 206 determines from the content of the message whether or not the message is a facsimile message. When the received message is a facsimile message, which can be received as a standard or enhanced CCITT group 3, group 4 message, the message controller 206 commands the facsimile endec 225 to decode the facsimile message into an optical image comprising bits grouped into scan lines. The bits represent the light and dark picture elements which have been scanned from a document by the facsimile machine 120 or 130, on a line by line basis.

In accordance with the preferred embodiment of the present invention, an example is presented of an A4 size (approximately 21.0 by 29.7 cm) English text document with graphics scanned at normal scanning resolution by the facsimile machine 120 or 130 and encoded in a CCITT group 3 message. The optical scanning operation performed by an optical scanner in the facsimile machine 120 or 130 results in an image having a picture element density of approximately 200 (vertical) by 200 (horizontal) dots per inch (dpi) or 80 by 80 dots per centimeter. The encoded facsimile image is transmitted through the PSTN 108 to the system controller 102. When the facsimile image is received by the system controller 102 from the network interface 207, the message controller 206 determines that the message is a fax message. The message controller 206 commands the facsimile endec 225 to decode the facsimile into an optical image and stores the decoded facsimile image in the target image memory 220. It will be appreciated that the facsimile endec 225 can, under proper command, selectively decode a sub-region of the facsimile message, for example, a 3" by 5" sub-region, into a target image and store the target image in the target image memory 220. It will be further appreciated that the facsimile endec 225 can also decode the facsimile message and store the whole facsimile message or a portion of the facsimile image at a resolution that is different from the resolution of facsimile message encoded by the CCITT Group 3 facsimile standards, for example, 100 dots (horizontally) by 100 dots (vertically) per inch. The resolution of the portion of the received image which is selected and stored in the target memory, is hereinafter referred to as T. The target image is encoded and transmitted to a receiving device such as a selective call receiver. The transmitting and receiving devices have a code book stored therein for decoding the encoded message. The code book is optimized for a predetermined resolution having a value C. When C is substantially less than T, the message controller 206 controls a disassembly of the target image into multiple sub-images, an encoding of the sub-images, and transmission of the target image to the receiver.

Referring to FIG. 4, an illustration of multiple sub-images generated from a target image of a document by the system controller 102 used in the communication system 100 of FIG. I is shown, in accordance with the preferred embodiment of the present invention. A target image 401 (illustrated as an outline of a target image, without image pixels being shown) is stored in the target image memory 220 (FIG. 2) and includes horizontal target image lines such as target image line 402. In the example given above of a 3 inch by 5 inch target image and a resolution of 200 by 200 pixels per inch, the target image includes 200 target image lines, each having 1000 pixels (5 inches ×200 pixels per inch). The target image lines 402 have a resolution, T, of 200 pixels per inch, which is greater than the resolution, C, for which a predetermined runlength code book stored in the receiver is optimized, which is 55 pixels per inch in this example. The interleaving ratio calculator 204 computes the interleaving ratio, T/C, which is 3.6363 in this example. The interleaving ratio calculator 204 further sets the number, S, of sub-images 403 to be generated from the target image 401, to the integer ceiling of the interleaving ratio, T/C. In this example, the integer ceiling (the next positive integer greater than or equal to the ratio) of the interleaving ratio 3.6363 is 4. The image dis-assembler 205 dis-assembles the target image into 4 sub-images 403 by interleaving each target line 4 times. The generation of the sub-images 403 includes a selection of each of the target image lines, such as the target image line 402, in a first predetermined order, which is typically, but not necessarily, from top to bottom.

Figure 5:
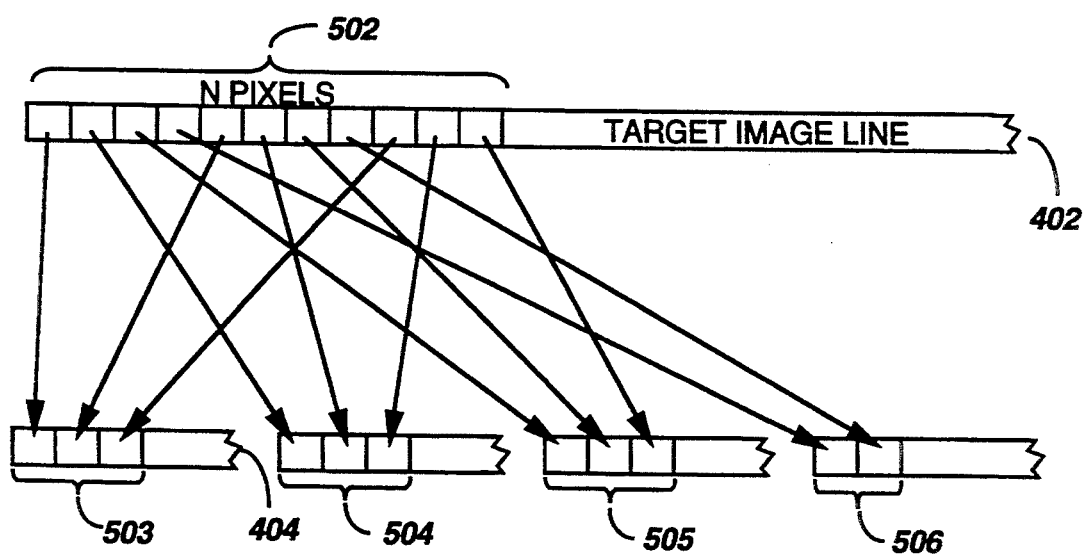
FIG. 5, an illustration of the generation of portions of the horizontal sub-image lines from a portion of the horizontal target image line illustrated in FIG. 4, in accordance with the preferred embodiment of the present invention.

Referring to FIG. 5, an illustration of the generation of portions of the sub-image lines 404 from a portion of the target image line 402 illustrated in FIG. 4, in accordance with the preferred embodiment of the present invention. The pixel group calculator 310 determines a scaled interleaving ratio by multiplying the interleaving ratio, T/C, by a predetermined scaling factor, D. The integer ceiling of the scaled interleaving ratio is a group size, N. Thus, $N = \text{integer ceiling } (D \times T/C).$ Continuing with the example given above, the target image resolution is 200 and the code book resolution is 55. The interleaving ratio, T/C, is therefore 3.636 and the number of sub-images, S, is 4. In this example of the preferred embodiment of the present invention, the predetermined scaling factor D is 3, and the group size, N, is the integer ceiling of 10.91, which is 11. The pixel group selector 320 selects groups of N contiguous pixels in a second predetermined order. The sub-image generator 325 copies each group of N (11 in this example) contiguous pixels 502, in a third predetermined order, on a one for one basis (that is, each pixel in the group of N contiguous pixels is copied once into a unique position within the sub-image lines), into pixel positions in portions of sub-image lines 503, 504, 505, 506, which lines correspond to the selected target image line. D (3 in this example) pixels from the group of 11 pixels 502 are copied into pixel positions in the first portion of sub-image line 503, 3 other pixels from the group of 11 pixels 502 are copied into pixel positions in the first portion of sub-image line 504, and 3 other pixels from the group of 11 pixels are copied from the group 502 into pixel positions in the first portion of sub-image line 505. The number of pixels remaining is $N - D * (S-1),$ which in this example is $11 - 3*3 = 2.$ The two remaining pixels are copied into pixel positions in the first portion of the sub-image lines 506 of the last sub-image. This example of the third predetermined order of copying from the group of pixels 502 to pixel positions in the portions of the sub-image lines 503, 504, 505, and 506, which copies D pixels into S-1 sub-image lines of S-1 sub-images, and copies the remaining N−D * (S-1) pixels into a line of the remaining one of the S sub-images, results in three sub-images which have resolutions between T/S and C. It will be appreciated that a variety of second predetermined orders exist for selecting the groups of N contiguous pixels from the target image line. For example, the selection could be made from right to left. It will also be appreciated that a large variety of third predetermined orders exist for selecting and copying the N contiguous pixels from each group of N contiguous pixels in the target image line to the portions of the sub-image lines. In the example given, the pixels are selected in a distributed manner (that is, pixels going into one sub-image line are non-contiguous in the group of pixels in the target line 502) in the target image line and copied in a semi-non-uniform manner (that is, S-1 sub-image lines get D pixels each, and the last sub-image line gets anywhere from 1 to D pixels) into the sub-image lines, so that three sub-images will have a resolution between T/S and C, but near to C. When the predetermined scale factor D is 1, the group size, N, is equivalent to S and the resolution of each sub-image line is T/S (which is always smaller than or equal to C). In the example presented above, when D is 1, the group size is 4 and the sub-image resolution is 200/4=50 (compared to the code book resolution, C, of 55).

Figure 6:
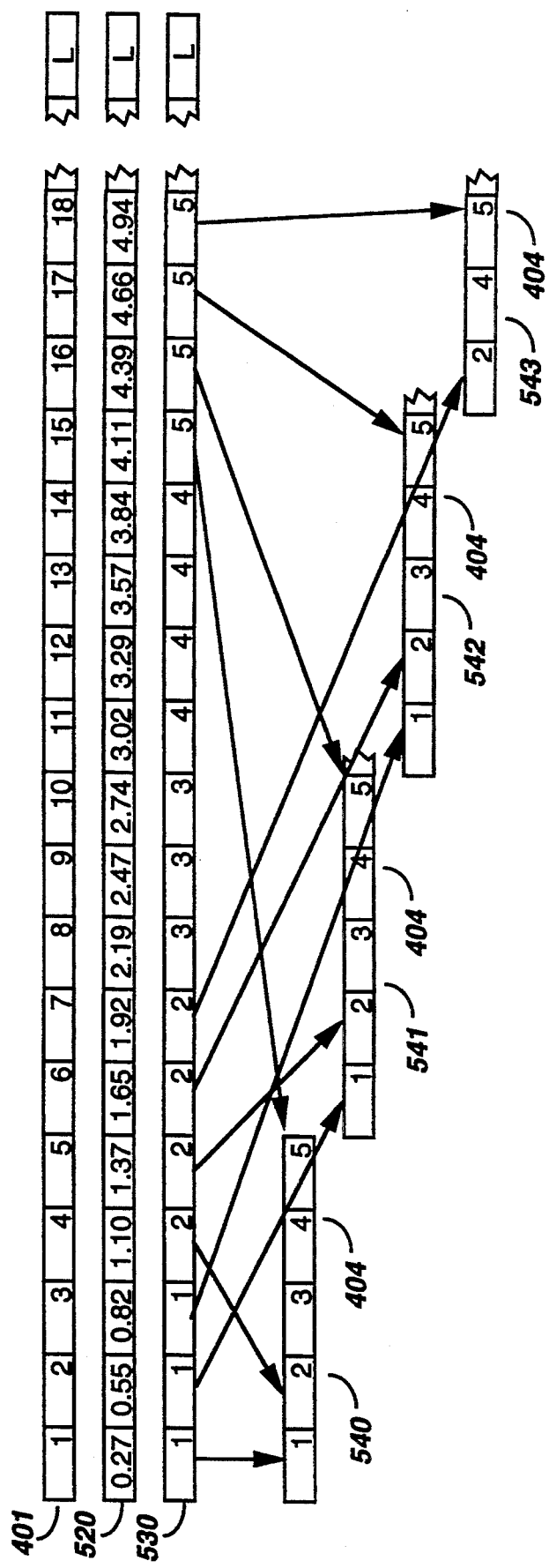
FIG. 6 is an illustration of the generation of portions of horizontal sub-image lines from a portion of a horizontal target image line illustrated in FIG. 4, in accordance with an alternate embodiment of the present invention.

Referring to FIG. 6, an illustration is shown of the generation of portions of the sub-image lines 404 from a portion of the target image line 402 illustrated in FIG. 4, in accordance with an alternative embodiment of the present invention. The pixel group calculator 310 determines scaled pixel values 520 for a predetermined maximum number, L, of pixels in any target image line 402 by dividing the ordinal position, from left to right, of each pixel in the target image line 402 by the interleaving ratio T/C, which is 3.6363 in this example. Group numbers 530 are determined from the integral ceiling of the scaled pixel values 520. Pixels having the same group number (i.e., in the same group) are identified by the pixel group selector 320 (shown in FIG. 3). The pixel groups are selected in order of group number, which is the second predetermined order for the alternative embodiment of the present invention. The selected group is then copied by the sub-image generator 325 into pixel positions in portions of the sub-image lines 404 in the third predetermined order, on a one for one basis, for the alternative embodiment of the present invention. In this example, pixels from each group are copied in the third predetermined order by the sub-image generator 325 from left to right in each group to the four sub-images in the sub-image memory 203, also ordered from left to right, as the first 540, second 541, third 542, and fourth 543 sub-image. It will be appreciated that, in this example of the alternative embodiment of the present invention, all groups of pixels in the target image line have either 3 or 4 pixels in them, and that S-1 sub-images (the first three sub-images 540, 541, 542 in this example) have, as a result of the calculation described, equivalent resolutions which are very close to C (55 in this example) pixels per inch. One sub-image, the fourth sub-image 543 in this example, has a resolution not necessarily the same as the S-1 sub-images have. The resolution of the one sub-image 543 is less than or equal to the resolution of the S-1 sub-images.

It will be appreciated that when the sub-images are generated with resolutions near to the resolution for which the code book in the receiver has been optimized, the efficiency of encoding the sub-images with the code book is higher.

It will be further appreciated that the effect of using the preferred or alternative embodiments of the present invention results in a relatively uniform distribution of the pixels from the target image into the sub-images. A beneficial affect of this distribution is to randomize burst errors, which has the effect of making many types of images more readable in the presence of burst errors than would otherwise be.

When the S sub-images are generated and have been stored in the sub-image memory 203 as described above, the sub-images are encoded, under control of the message controller 206, by the facsimile endec 225 into S facsimile sub-image messages, using the predetermined code book identical to the one stored in the receiver. The message controller 206 then transmits a digital radio signal to the receiver which includes the S facsimile sub-image messages arranged in a fourth predetermined order, which in this example is with the sub-image which includes sub-image line 506 being sent last. Also included by the message controller 206 in the digital radio signal is parametric information needed by the receiver to decode the message, coupled to the message controller 206 from the pixel group calculator 310. In the case of the first embodiment of the present invention, the parametric information includes the target image resolution, T. In the case of the second embodiment of the present invention, the parametric information includes the target image resolution, T, and the scale factor, D. It will be appreciated that, in some systems, for example, wherein all target images have an identical resolution, T, or the scale factor, D, is not varied, one or both of the parametric values (T and D) may be predetermined, and therefore, need not be sent to the receiver.

It will be further appreciated that, in an alternative controller embodiment (not shown), the message controller 206 is not necessary for controlling the encoding of the S facsimile sub-image messages and parametric information for inclusion into the digital radio signal. In the alternative controller embodiment, the encoding control functions described above which are handled by the message controller 206 are handled by a task which is handed off from the facsimile endec 225, to the interleaving ratio calculator 204, to the image dis-assembler 205 and back to the facsimile endec. The task encodes the sub-image messages and generates the parametric information which is included in the digital radio signal for transmission under control of the message controller 206.

Figure 7:
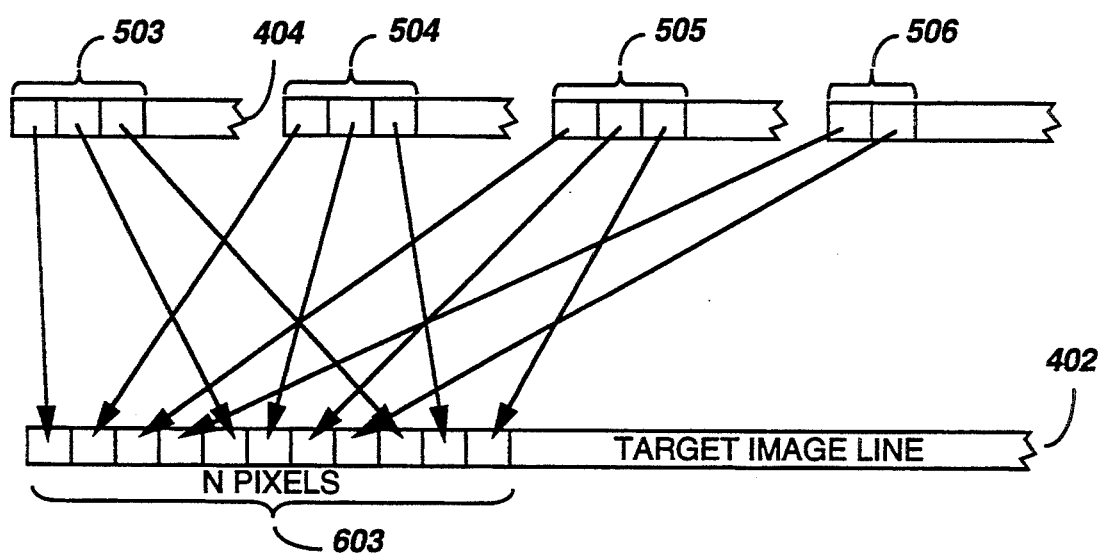
FIG. 7 is an illustration of a re-assembly of the portion of the horizontal line located in the target image illustrated in FIG. 2, in accordance with the preferred embodiment of the present invention.

Referring to FIG. 7, an illustration of a re-assembly of the portion of the target image line 402 located in the target image 401 illustrated in FIG. 4 is shown, in accordance with the preferred embodiment of the present invention. The target image line 402 is re-assembled by a selective call facsimile receiver from the S (in this example, 4) sub-image lines 404. Groups of N (11 in this example) contiguous pixel positions in the selected target image line are numbered sequentially. In this example, the pixels in the target line are numbered from left to right:

1,1,1,1,1,1,1,1,1,1,1,2,2,2,2,2,2,2,2,2,2,2,3,3,3,3. . . etc.

Groups of D, or 3 in this example, contiguous pixels are numbered in a corresponding predetermined set of S-1, or 3, sub-image lines. In this example, the pixels in each of three sub-image target lines are numbered from left to right:

1,1,1,2,2,2,3,3,3,4,4,4,5,5,5,6. . . etc.

A numbered group of N (in this example, N is 11 pixels and the group number is 1) contiguous ordered pixel positions 603 of the target image line 402 is selected to be completed, or filled, by copying 11 pixels from the sub-image lines 404. From a predetermined set of S-1 (3 in this example) sub-images, contiguous groups of D (3 in this example) pixels having the same group number (in this case, 1) are selected from the sub-image lines 503, 504, 505 which correspond to the target image line 402 selected for filling. The 9 (3×3) pixels are copied from the 3 sub-image lines 404 to the target image line 603, on a one for one basis, by using the third predetermined order used for interleaving (described above with reference to FIG. 6), but reversing the direction of copying, so as to copy from the sub-image lines to the target image line. A remaining group of N−D * (S−1) (11−9=2 in this example) contiguous pixels in the target image line 402 are re-assembled from group number 1 pixels selected from the sub-image line 506 of the remaining sub-image (the sub-image which is not of the predetermined S-1 sub-images). The groups of pixel positions in the target image line and the groups of pixels in the sub-image line are each numbered in the second predetermined order used for interleaving, which in this example is from left to right. Completed target image lines 402 are re-assembled into the target image 401 in the first predetermined order used for interleaving, which is from top to bottom in this example.

Figure 8:
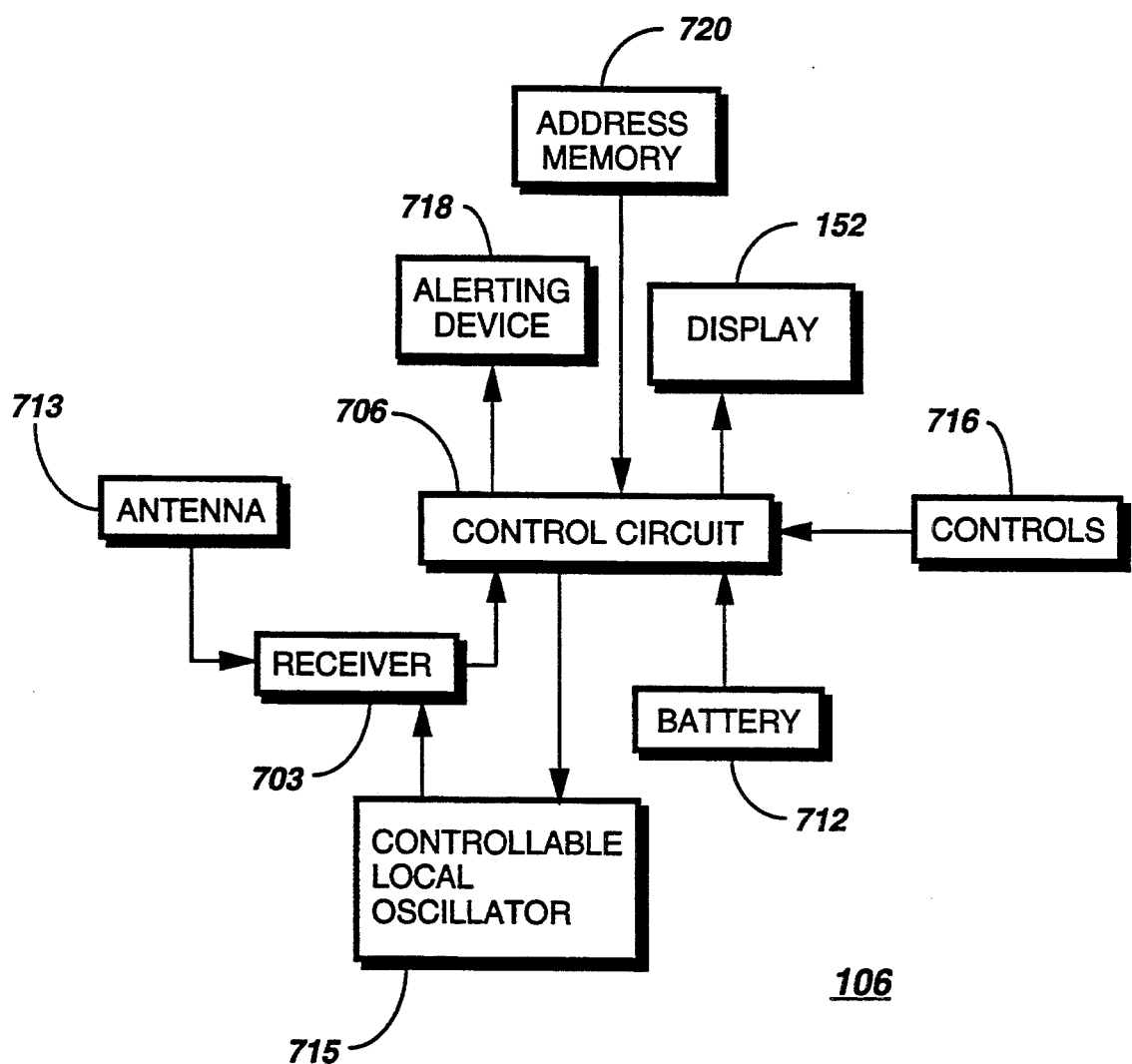
FIG. 8 is an electrical block diagram of a portable receiving device, for use in the radio communication system of FIG. 1, in accordance with the preferred embodiment of the present invention.

Referring to FIG. 8, an electrical block diagram is shown of the portable receiving device 106 powered by a battery 712, in accordance with a preferred embodiment of the present invention. The portable receiving device 106 operates to receive a radio signal via an antenna 713 which is coupled to a receiver 703. The receiver 703 operates to filter, convert, and demodulate the received digital radio signal using conventional techniques and couples the demodulated signal to a control circuit 706, comprising control logic for decoding and recovering a selective call message contained within the signal, in a manner well known in the art. The selective call message includes an address and may include other information such as a telephone number, alphanumeric data, or graphics. An address memory 720 which stores a predetermined address is coupled to the control circuit 706. The control circuit 706 compares the address recovered from the selective call message to the predetermined address and continues processing the message when the comparison meets predefined criteria. When the comparison does not meet predetermined criteria, the selective call receiver ceases the processing of the selective call message. The control circuit 706 also comprises a frequency correction means which is coupled to a controllable local oscillator 715 for controlling a reference frequency used to generate a local oscillator signal which is coupled to the receiver 703. The local oscillator signal is used by the receiver 703 for the frequency conversion of the received signal. As determined by the contents of the recovered selective call message and the settings of user controls 716 which are coupled to the control circuit 706, the portable receiving device 106 may further process a selective call message by presenting at least a portion of the selective call message, using the display 152 (shown in FIG. 1), such as a liquid crystal display, and by signaling the user via a sensible alerting device 718 that a selective call message has been received. The display 152 and sensible alert device 718 are coupled to the control circuit 706.

Figure 9:
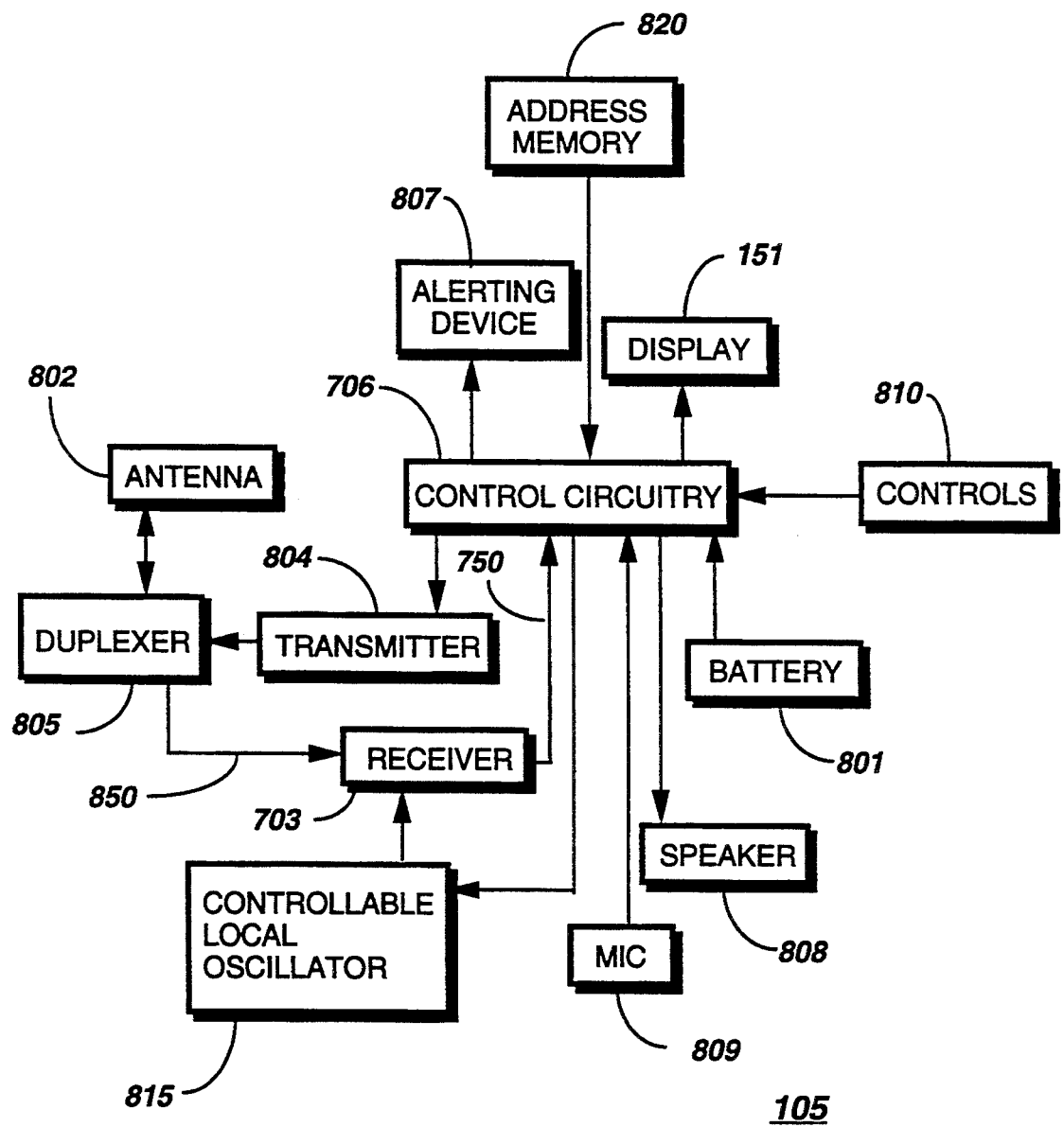
FIG. 9 is an electrical block diagram of a personal radio telephone, for use in the selective call radio communication system of FIG. 1, in accordance with the preferred embodiment of the present invention.

Referring to FIG. 9, an electrical block diagram is shown of the personal radio telephone 105 powered by a battery 801, in accordance with a preferred embodiment of the present invention. A radio frequency (RF) signal having a carrier frequency is received and transmitted by an antenna 802. The antenna 802 is coupled to a receiver 703 and a transmitter 804 by a duplexer 805. The received signal is filtered, the frequency of the signal is converted, and the signal is demodulated by the receiver 703. The demodulated signal, which includes a digital information portion and may include voice information, is coupled from the receiver 703 to a control circuit 706 comprising control logic for filtering the demodulated signal and recovering information contained within the received signal. The information includes an address and may include other information, such as a voice signal, a telephone number, alphanumeric data, or graphics. An address memory 820 which stores a predetermined selective call address is coupled to the control circuit 706. The control circuit 706 compares the address recovered from the information to the selective call address and continues processing the information when the comparison meets predefined criteria. When the comparison does not meet predetermined criteria, the control circuit 706 stops processing the information. The control circuit 706 also comprises a frequency correction means which is coupled to a controllable local oscillator 815 for controlling a reference frequency used to generate a local oscillator signal which is coupled to the receiver 703. The local oscillator signal is used by the receiver 703 for the frequency conversion of the received signal. The control circuit 706 is further coupled to an alerting device 807, the display 151 (shown in FIG. 1), a speaker 808, a microphone 809, and a set of controls 810. The recovered information is used by the control circuit 706 to activate the alert 807 (a ringer in the case of a cellular radio telephone), and after answering the call, to sustain a telephone connection. When the demodulated signal includes alphanumeric data, the control circuit 706 presents the alphanumeric data on the display 151 (shown in FIG. 1 ) such as a liquid crystal display. When the telephone connection is completed, the user audibly communicates with another party via the speaker 808 and the microphone 809. The control circuit 706 routes recovered audio to the speaker 808 which converts electrical energy into acoustical energy thus enabling the user to hear any communications. The microphone 809 is used to convert acoustic energy into electrical energy for use by the control circuit 706 in modulating the radio frequency carrier produced by the transmitter 804.

The user initiates a call by activating a proper control from the set of controls 810 and entering a number of a party to be contacted. When entering and sending a number, the number may be presented on the display 151 to provide the user with visual feedback confirming the number entered and subsequently sent.

In both the personal radio telephone 105 and the portable receiving device 106, it will be appreciated that the control circuit 706 preferably comprises a microprocessor such as one of the 68HC05 family made by Motorola, Inc. of Schaumburg, Ill., and may also comprise application specific integrated circuits which implement functions such as a signal processor (e.g., a filter and decoder), a conventional signal multiplexer, and a voltage regulator that may supply a regulated voltage to other portions of the radio. The display 151, 152 is preferably an LCD display of a type well known to those skilled in the art. Alternatively, the associated control circuit 706 may include circuits such as digital logic, analog to digital converters, digital to analog converters, programmable input-output ports, a control bus, audio power amplifier circuitry, control interface circuitry, a clock or local oscillator frequency synthesizer, and display illumination circuitry. These elements are conventionally assembled to provide well known features offered in the personal radio telephone 105 or portable receiving device 106 desired by customers.

Figure 10:
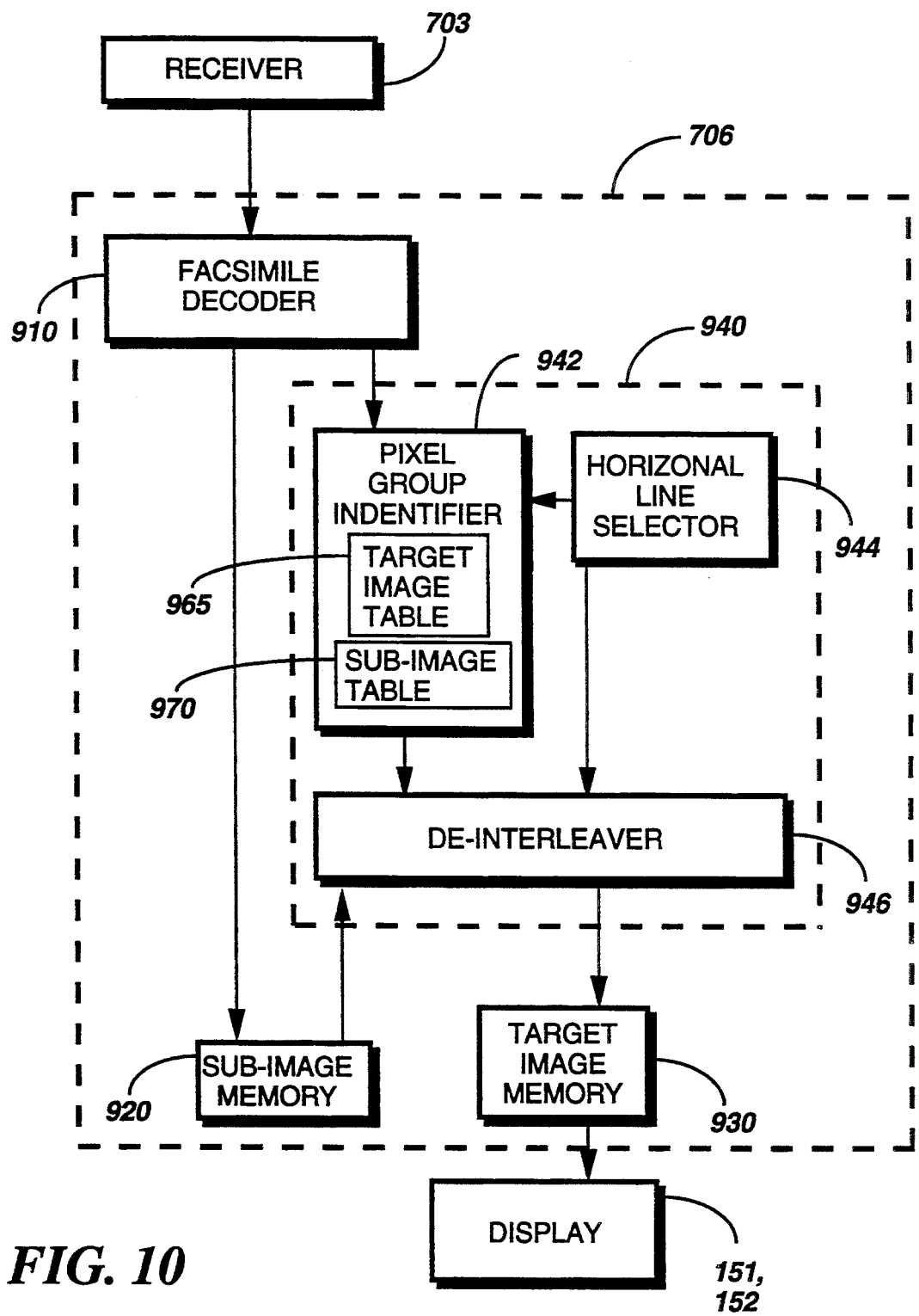
FIG. 10 is an electrical block diagram of a portion of a control circuit suitable for use in the portable receiving device of FIG. 8 and the personal radio telephone FIG. 9, in accordance with the preferred embodiment of the present invention.

Referring to FIG. 10, an electrical block diagram is shown of a portion of the control circuit 706 suitable for use in the selective call receiver of FIG. 6 and FIG. 7. The portion of the control circuit 706 shown in FIG. 9 comprises a facsimile decoder 910, a sub-image memory 920, a target image memory 930, and an image generator 940. The image generator 940 further comprises a pixel group selector 942, a line selector 944, and a de-interleaver 946. The control circuit 706 decodes the target image from the digital radio signal. The digital radio signal includes S facsimile sub-image messages transmitted in a predetermined order. The selective call receiver stores a runlength code book optimized to a predetermined resolution C in the facsimile decoder 910. The facsimile decoder 910 generates S sub-images from the encoded messages. Each of the S sub-images includes sub-image lines comprising pixels, encoded by the runlength code book. The sub-image memory 920 is coupled to the facsimile decoder 910, and stores the S sub-images. The image generator 940 is coupled to the sub-image memory 920 and to the facsimile decoder 910, and re-assembles the target image from the S sub-images. The target image memory 930 is coupled to the image generator 940 and stores the target image. The line selector 944 selects, in a first predetermined order, each line of the target image for re-assembly. The line selector 944 further selects S sub-image lines corresponding to each selected target image line, wherein each sub-image line is associated with a different one of the S sub-images. The pixel group selector 942 is coupled to the line selector 944 and determines group numbers associated with each pixel position in the target image line, and also determines group numbers associated with each pixel in each of the S selected sub-image lines. The de-interleaver 946 is coupled to the pixel group selector 942 and the line selector 944 and copies, in a third predetermined order, pixels in each of the S selected sub-image lines into pixel positions in the target image line. The pixels are copied into pixel positions associated with the same group number as the pixels.

In the preferred embodiment of the present invention, the target image resolution, T, and the scale factor, D, are transmitted in the digital radio signal. When the selective call receiver receives the digital radio signal, the values T and D are recovered from the demodulated signal by the control circuit 706, and coupled to the pixel group selector 942. The pixel group selector 942 comprises a target image table generator 965 and a sub-image table generator 970 for generating pixel group numbers. The target image table generator 965 generates a list of pixel group numbers corresponding to the pixel positions in the target image line 402 by setting a group size, N, equal to the integer ceiling (11 in this example) of the product of the scale factor, D (3 in this example), and the interleaving ratio, T/C (3.63 in this example), identifying groups of N contiguous pixels, and selecting, in the second predetermined order described above with reference to FIG. 5, a group of N (11) contiguous pixel positions in the target image line. The sub-image table generator 970 generates a list of the pixel group numbers corresponding to the pixels in the sub-image line of a predetermined one of the S sub-images by selecting groups of contiguous N−D * (S−1) pixels in the sub-image line of a predetermined one of the S sub-images in the second predetermined order (left to right in this example) and associating a unique group number (consecutive integers in this example) with each of the selected groups of N−D * (S−1) pixels. The sub-image table generator 970 further identifies groups of D pixels in each of the sub-image lines of a S−1 of the S sub-images in the second predetermined order and associates a unique group number with the selected groups of D pixels. The pixels are then copied from the sub-image lines having the same pixel group number to the target image line using the sub-image and target image tables to identify pixels to be copied, and using the third predetermined order in reverse, as described above, to determine to order of pixel copying. FIG. 7 illustrates the pixels in the number 1 groups of pixels in the sub-image lines 404 being copied into group number 1 (603 FIG. 7) of the target image line 402. There are 3 (S−1) groups of 3 (D) pixels and one group of 2 (N−D * (S−1)) pixels in the four sub-image lines 404 being copied into the target image line.

In the alternative embodiment of the present invention, only the target image resolution, T, is transmitted in the digital radio signal. When the selective call receiver receives the digital radio signal, the resolution T is recovered from the demodulated signal by the facsimile decoder 910, which couples the resolution T to the pixel group selector 942. The pixel group selector 942 comprises a target image table generator 965 and a sub-image table generator 970 for generating the pixel group numbers. The target image table generator 965 generates a list of pixel group numbers 530 (FIG. 6) corresponding to each pixel position in the target image line 401 (FIG. 6). Each pixel group number in the list 530 is the integer ceiling of the quotient of the corresponding pixel position and the interleaving ratio, T/C. Groups comprise pixels having the same pixel group number. Groups having exactly S pixels are identified as full groups. All other groups consist of S-1 pixels. The sub-image table generator 970 generates a list of the pixel group numbers corresponding to the pixels in the sub-image line of a predetermined one (i.e., the last sub-image 543 of FIG. 5 in the above example) of the S sub-images by making a sequence consisting of the pixel group numbers of the full groups. (The list in FIG. 6 is 2,4,5. . . ). The sub-image table generator 970 further generates a list of the pixel group numbers corresponding to the pixels in the sub-image lines of S-1 of the S sub-images other than the predetermined one (i.e., the first three sub-images 540, 541, 542 of FIG. 5 in the above example), wherein the list consists of an arithmetic sequence of positive integers beginning with 1,2,. . (The list in FIG. 6 is 1,2,3,4,5).

It will be appreciated that the target and sub-image tables may be stored in memory when the parameters T and D are predetermined.

It will be appreciated that while the digital radio signal is being received by the selective call receiver, the selective call receiver can process the first received sub-image performing the facsimile decoding thereof while the remaining images continue to be received, and presenting the sub-image on the display 151. The displayed image will be of low resolution compared to the final image, but could be beneficial in providing an early display of the information while the user waits for the remainder of the message to be received and decoded.

Figure 11:
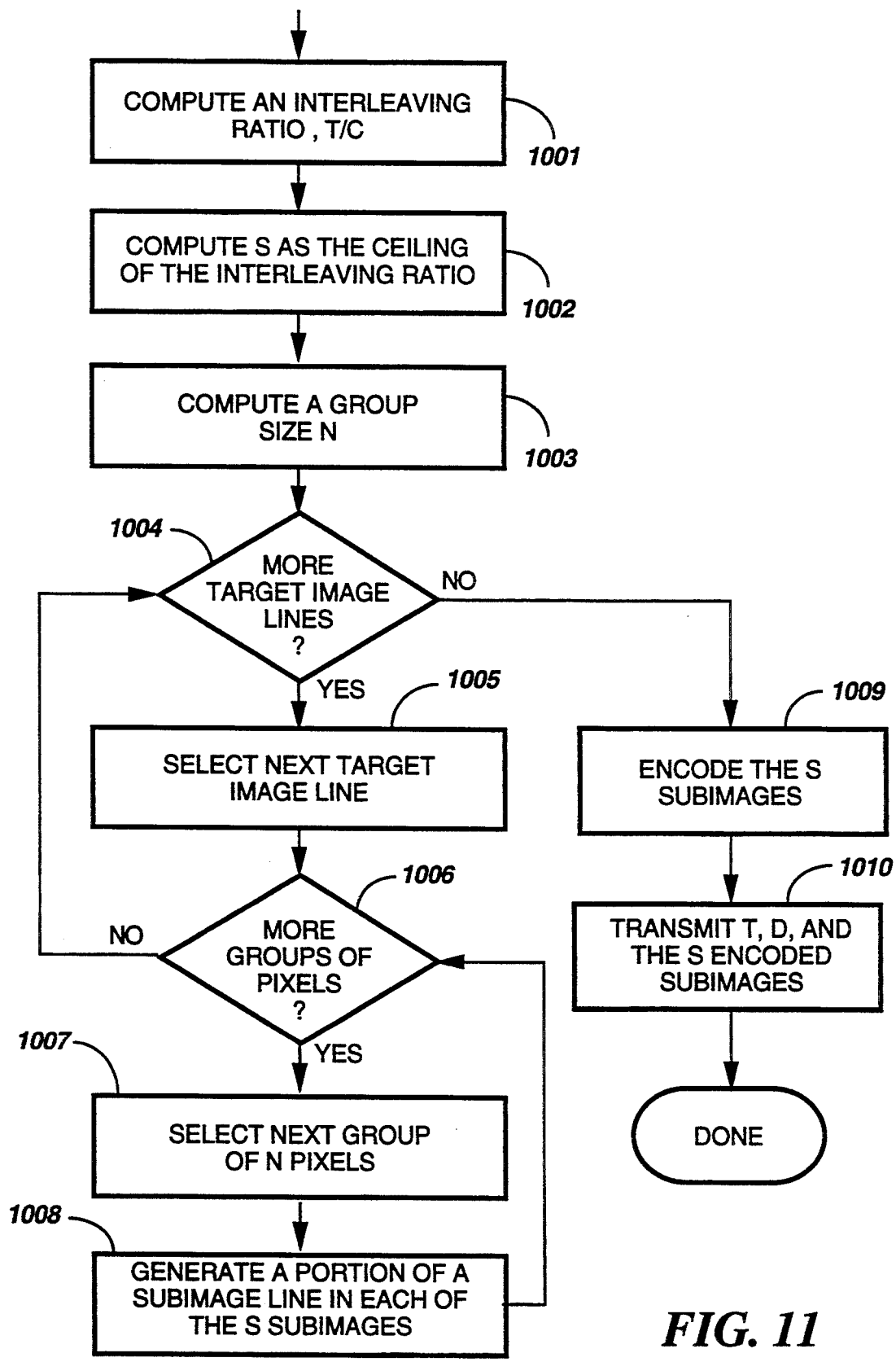
FIG. 11 is a flow chart showing a method for use in the system controller of FIG. 4, for generating and transmitting a facsimile message including multiple sub-images, in accordance with the preferred embodiment of the present invention.

Referring to FIG. 11, a flow chart shows a method for use in the system controller 102 for generating and transmitting a facsimile message including multiple sub-images, in accordance with the preferred embodiment of the present invention. At step 1001, the interleaving ratio, T/C, is computed. A positive integer S, which is the number of sub-images to be generated, is computed at step 1002 as the ceiling of the interleaving ratio computed at step 1001. At step 1003, a group size, N, is determined, which is the integer ceiling of the product of a scale factor, D, and the interleaving ratio. At step 1004, a check is performed to determine when more target image lines are to be encoded. When more target image lines are to be encoded, at step 1005, a target image line is selected according to the first predetermined order. For the selected target image line, at step 1006, a check is performed to determine when more groups of pixels are to be encoded. When there are more pixels groups to be encoded, at step 1007, a group of N pixels is selected in the second predetermined order. For the selected pixel group, at step 1008, a portion of a sub-image line in each of the S sub-images is generated in the third predetermined order as described above with reference to FIG. 5 and a check is performed, at step 1006, to determine when more pixels groups are to be encoded for the selected target image line. When no more pixels groups are to be encoded for target image line a check is performed, at step 1004, to determine when there remain more target image lines to be encoded. When no more target image lines remain, at step 1009, the S sub-images generated are encoded using the lower-resolution code book identical to the run-length code book stored in the selective call receiver. At step 1010, the positive integers T and D, and the S encoded sub-images are transmitted to the selective call receiver.

Figure 12:
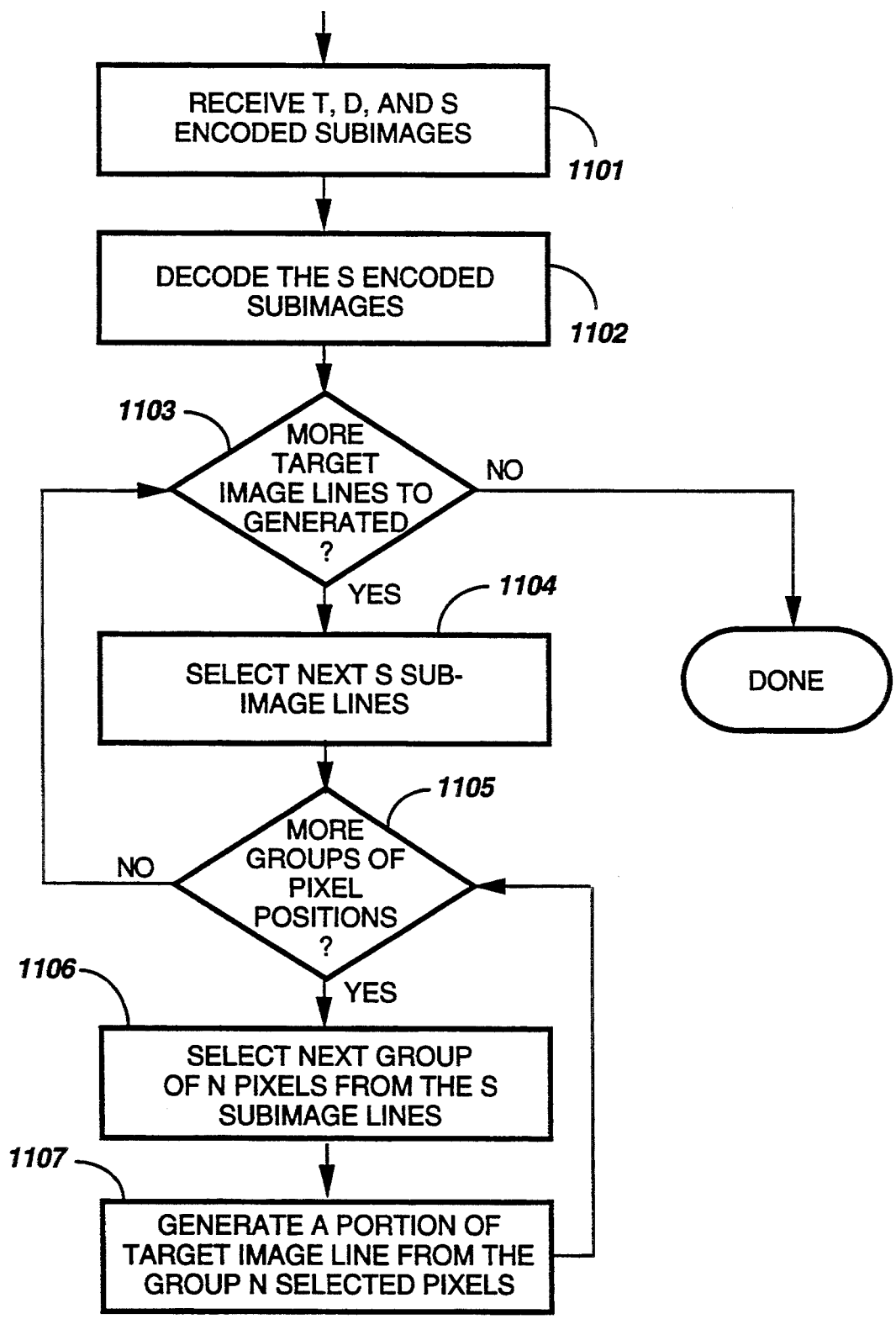
FIG. 12 is a flow chart showing a method for use in the selective call receivers of FIG. 4 and FIG. 5, for re-assembling the target image from the transmitted facsimile message, in accordance with the preferred embodiment of the present invention.

Referring to FIG. 12, a flow chart shows a method for use in the selective call receiver 105, 106 of FIG. 8 and FIG. 9 for re-assembling the target image from the transmitted facsimile message, in accordance with the preferred embodiment of the present invention. At step 1101, positive integers T and D, and S encoded sub-images are received by the selective call receiver and S is determined as the ceiling of the product of D and the interleaving ratio, T/C. At step 1102, the S encoded sub-image are decoded using the runlength code book stored in the receiver. A check is performed, at step 1103, to determine when more target image lines are to be generated. When more target image lines are to be generated, at step 1104, S sub-image lines are selected according to the first predetermined order from the S decoded sub-images. For the selected S sub-image lines, a check is performed, at step 1105, to determine when more groups of pixel positions of the target image line are to be generated. When more groups of pixel positions are to be generated, at step 1106, a group of N pixels from the S decoded sub-image lines are selected according to the second predetermined order. At step 1107, the group of N pixels selected from the S decoded sub-image lines are used to generate a portion of the selected target image line in the third predetermined order, as described with reference to FIG. 7.

It will be appreciated that in some systems, the number of sub-images, S, may be included with the parameters T and D in the transmitted signal, so that the receiver can process the received sub-image messages before the received parameters T and D are used with the predetermined parameter C to calculate S.

It will be appreciated that the present invention is also beneficial in non-radio communication systems. For example, personal communicators which receive facsimile messages when connected by either radio or wireline service to a controller, and which receive target images having higher resolution than internally stored code books can benefit from the present invention when connected by wireline.

By now it should appreciated that one or more embodiments of the present invention can facilitate early and progressively improving views of a facsimile image on a selective call receiver by displaying a decoded sub-image as soon as one of the sub-image messages is received and decoded.

It should be further appreciated that the use of one of the embodiments of the present invention typically results in more efficient use of the lower-resolution code book stored in a selective call receiver, by reducing transmitted message lengths, which saves valuable time.

Furthermore, in the case of a radio system, valuable radio spectrum resources are also saved.

It should be also appreciated that the unique addition of interleaving in the present invention has the benefit of diffusing transmission errors. A single error occurring in a target image line will no longer result in the lost of the whole target image line.

We claim:

1. A method for use in a controller for generating and transmitting a target image to a receiver, wherein the target image is facsimile encoded and includes target image lines comprising pixels, and the target image lines have a resolution, T, which is greater than a predetermined resolution, C, for which a runlength code book stored in the receiver is optimized, said method comprising the steps of:

computing a number, S, of sub-images from an interleaving ratio, T/C;

dis-assembling the target image into S sub-images comprising sub-image lines; and encoding each of the S sub-images into one of S facsimile sub-image messages using a runlength code book identical to the runlength code book stored in the receiver.

2. The method according to claim 1, wherein S is an integer ceiling of the interleaving ratio, T/C.

3. The method according to claim 1, further comprising the step of transmitting the S facsimile sub-image messages to one or more selective call receivers in a digital radio signal.

4. The method according to claim 3, wherein the resolution, T, of the target image lines is included in the digital radio signal.

5. The method according to claim 1, wherein each of the S sub-images has a resolution substantially equal to T/S.

6. The method according to claim 1, wherein each of S-1 of the S sub-images has a resolution substantially equal to C.

7. The method according to claim 1, wherein said step of dis-assembling the target image comprises the steps of:

determining a group size, N, of groups of N contiguous pixels within the target image lines;

selecting, in a first predetermined order, each target image line;

selecting, in a second predetermined order, each group of N contiguous pixels within each selected target image line; and distributing, in a third predetermined order, the pixels from each selected group of N contiguous pixels, wherein distribution is among S sub-image lines corresponding to the selected target image line, and wherein each of the S sub-image lines is associated with a different one of the S sub-images.

8. The method according to claim 7, wherein said step of determining the group size, N, comprises setting N to S, and wherein said step of distributing the pixels in a third predetermined order comprises copying each unique pixel from each selected group into a different one of the S sub-image lines.

9. The method according to claim 7, wherein said step of determining the group size, N, comprises setting N to an integer ceiling of a product of a predetermined integer, D, and the interleaving ratio, T/C, and wherein said step of distributing the pixels comprises copying, in the third predetermined order, $N - D * (S-1)$ unique pixels from the selected group of N contiguous pixels into a predetermined one of the S sub-image lines, and copying, in the third predetermined order, $S-1$ sets of D unique pixels from the selected group of N contiguous pixels into each of a predetermined S-1 of the S sub-image lines.

10. The method according to claim 1, further comprising the step of transmitting the S facsimile sub-image messages to one or more selective call receivers in a digital radio signal, wherein the digital radio signal includes the S facsimile sub-image messages and a scale factor, D.

11. The method according to claim 1, wherein said step of dis-assembling the target image comprises the steps of:

selecting, in a first predetermined order, each line of the target image;

calculating groups of contiguous pixels in each selected line of the target image;

selecting, in a second predetermined order, each of the groups of contiguous pixels in the selected line of the target image; and distributing, in a third predetermined order, the pixels from each selected group, wherein distribution is among S sub-image lines corresponding to the selected line of the target image, and wherein each sub-image line is associated with one of the S sub-images.

12. The method according to claim 11, wherein, in said step of calculating the groups of contiguous pixels, a group number is assigned to each pixel in each selected line of the target image, and wherein the group number is an integer ceiling of a quotient of an ordinal position of each pixel and the interleaving ratio, T/C, wherein each group of contiguous pixels consists of pixels having a same group number, and wherein said step of distributing the pixels in a third predetermined order from each group of contiguous pixels comprises the steps of:

copying each unique pixel of a group of contiguous pixels to a different one of a predetermined S-1 of the S sub-image lines when the selected group of N contiguous pixels comprises S-1 pixels; and copying each unique pixel of a group of N contiguous pixels to a different one of the S sub-image lines when the selected group of contiguous pixels comprises S pixels.

13. An image encoder which generates and transmits a facsimile encoded target image to a receiver, wherein the target image includes lines comprising pixels stored in a target image memory, and the lines have a resolution, T, which is greater than a predetermined resolution, C, for which a runlength code book stored in the receiver is optimized, wherein said image encoder comprises:

a ratio calculator for computing a number of sub-images, S, from a interleaving ratio, T/C, which is a ratio of the resolution, T, of the lines of the target image to the predetermined resolution, C, of the runlength code book stored in the receiver;

an image dis-assembler, coupled to said ratio calculator and the target image memory, for dis-assembling the target image into S sub-images, wherein S is a positive integer;

a sub-image memory, coupled to said image dis-assembler, for storing the S sub-images; and a facsimile message encoder, coupled to said sub-image memory, for encoding each of the S sub-images into a facsimile sub-image message, using a runlength code book identical to the runlength code book stored in the receiver.

14. The encoder according to claim 13, wherein said image dis-assembler comprises:
  a line selector, for selecting, in a first predetermined order, each line of the target image;
  a pixel group calculator, coupled to said ratio calculator, for calculating groups of contiguous pixels in each target image lines;
  a pixel group selector, coupled to said line selector and said pixel group calculator, for selecting, in a second predetermined order, each group of contiguous pixels within each selected line of the target image; and
  a sub-image generator, coupled to said pixel group selector, said pixel group calculator, said line selector, said sub-image memory, and to the target image memory, for generating portions of S sub-image lines corresponding to the selected line of the target image, wherein each sub-image line is associated with one of the S sub-images, by copying each unique pixel from each selected group of contiguous pixels one of the portions of S sub-image line, in a third predetermined order.

15. A system controller which generates and transmits a digital radio signal which includes a facsimile encoded target image to a selective call receiver, wherein the target image includes lines comprising pixels stored in a target image memory, and the lines have a resolution, T, which is greater than a predetermined resolution, C, of a runlength code book stored in the selective call receiver, wherein the system controller comprises:
  a ratio calculator for computing a number of sub-images, S, from a interleaving ratio, T/C, which is a ratio of the resolution, T, of the lines of the target image to the resolution, C, of the runlength code book stored in the selective call receiver;
  an image dis-assembler, coupled to said ratio calculator and the target image memory, for dis-assembling the target image into S sub-images, wherein S is a positive integer, said image dis-assembler comprising;
  a line selector, for selecting, from top to bottom, each line of the target image;
  a pixel group calculator, coupled to said ratio calculator, for calculating groups of contiguous pixels in each target image line by assigning a group number to each pixel, wherein each group of contiguous pixels consists of pixels assigned the same group number, and wherein the group number is an integer ceiling of a quotient of an ordinal position of each pixel and the interleaving ratio, T/C;
  a pixel group selector, coupled to said line selector and said pixel group calculator, for selecting, from left to right, each of the ordered group of contiguous pixels in the selected line of the target image; and
  a sub-image generator, coupled to said pixel group selector, said pixel group calculator, said line selector, and to the target image memory, which copies each unique pixel to a different one of a predetermined S-1 of the S sub-image lines when the selected group comprises S-1 pixels, and which copies each unique pixel to a different one of the S sub-image lines when the selected group comprises S pixels;
  a sub-image memory, coupled to said sub-image generator, for storing the S sub-images;
  a facsimile message encoder, coupled to said sub-image memory, for encoding each of the S sub-images into a facsimile sub-image message, using a runlength code book identical to the runlength code book stored in the receiver; and
  a transmitter, coupled to said facsimile message encoder, for transmitting the S encoded facsimile sub-image messages and the target resolution, T, to the selective call receiver within the digital radio signal.

16. A method for use in a receiver for decoding a target image from a signal, wherein the receiver stores a runlength code book optimized to a predetermined resolution C, said method comprising the steps of:
  receiving S facsimile encoded sub-image messages included in the signal, each facsimile encoded sub-image message comprising a plurality of encoded sub-image lines, wherein the S facsimile encoded sub-image messages are in a predetermined order;
  generating S sub-images from the S facsimile encoded sub-image messages, wherein each of the S sub-images includes a plurality of sub-image lines comprising pixels, using the runlength code book;
  re-assembling a target image line, wherein the target image line comprises pixels re-assembled from one of the plurality of sub-image lines from each of the S sub-images; and
  re-assembling the target image by repeating said step of reassembling a target image line, in a first predetermined order.

17. The method according to claim 16, wherein said step of generating S sub-images comprises the steps of:
  decoding each of the encoded sub-image lines of the S facsimile encoded sub-image messages into a sub-image line using the runlength code book; and
  storing the sub-image line in the sub-image memory.

18. The method according to claim 16, wherein said step of re-assembling a target image line from the S sub-images comprises the steps of:
  selecting S sub-image lines corresponding to the target image line, wherein each sub-image line is associated with a different one of the S sub-images;
  first determining group numbers associated with each pixel position in the target image line;
  second determining group numbers associated with each of the pixels in the one of the plurality of sub-image lines from each of the S sub-images; and
  selecting pixel positions having a group number in the target image line and pixels in the one of the plurality of sub-image lines from each of the S sub-images having an equivalent group number,
  copying, in a third predetermined order, the selected pixels in the one of the plurality of sub-image lines from each of the S sub-images into the selected pixel positions in the target image line.

19. The method according to claim 18, wherein the number of sub-images, S, is predetermined, and wherein
  said step of first determining the group numbers comprises the step of associating group numbers from a first table to pixel positions in the target image line; and wherein
  said step of second determining the group number comprises the step of associating group numbers from a second table to each of the pixels in the one of the plurality of sub-image lines from each of the S sub-images.

20. The method according to claim 18,
wherein the target image has a target image resolution, T,
wherein an interleaving ratio is equal to T/C,
wherein said step of first determining group numbers comprises the step of generating a list of group numbers corresponding to the pixel positions in the target image line, wherein each group number in the list is an integer ceiling of a quotient of the corresponding pixel position and the interleaving ratio, T/C,
wherein group numbers of the same value which appear exactly S times in the list are identified as full groups, and
wherein said step of second determining the group numbers comprises the steps of:
generating a list of the group numbers corresponding to the pixels in the sub-image line of a predetermined one of the S sub-images by making a sequence consisting of the group numbers of the full groups; and
generating a list of the group numbers corresponding to the pixels in the sub-image lines of S-1 of the S sub-images other than the predetermined one of the S sub-images, which consists of an arithmetic sequence of positive integers beginning with 1,2.

21. The method according to claim 20, wherein the signal further includes the target image resolution, T, further comprising the following step:
receiving the target image resolution, T, in the signal.

22. The method according to claim 20, wherein the target image resolution, T, is predetermined.

23. The method according to claim 18,
wherein the target image has a target image resolution, T,
wherein an interleaving ratio is equal to T/C, and
wherein said step of first determining the group numbers comprises the steps of:
setting a group size, N, to an integer ceiling of a product of a scale factor, D, and an interleaving ratio which is equal to T/C;
selecting, in a second predetermined order, a group of N contiguous pixel positions in the target image line; and
associating a unique group number with each pixel within the selected group of N contiguous pixels, and wherein
said step of second determining group numbers comprises the steps of:
selecting, in the second predetermined order, a group of contiguous N−D * (S-1) pixels in one of the S sub-image lines, wherein the one of the S sub-image line is from a predetermined one of the S sub-images;
associating a unique group number with each pixel within the selected group of N−D * (S-1) pixels;
selecting, in the second predetermined order, a group of contiguous N−D * (S-1) pixels in each of S-1 of the S sub-image lines, wherein the S-1 of the S sub-image lines are from a predetermined S-1 of the S sub-images; and
associating a unique group number with each pixel within the selected groups of D pixels.

24. A decoder for decoding a target image from a signal, wherein the signal includes S facsimile encoded sub-image messages transmitted in a predetermined order, and wherein the decoder stores a runlength code book optimized to a predetermined resolution C, wherein the decoder comprises:
a facsimile decoder for generating S sub-images from the S facsimile encoded sub-image messages, wherein each of the S sub-images includes sub-image lines comprising pixels, using the runlength code book;
a sub-image memory, coupled to said facsimile decoder, for storing the S sub-images;
a target image generator, coupled to said sub-image memory and said facsimile decoder, for re-assembling the target image from the S sub-images; and
a target image memory, coupled to said target image generator, for storing the target image.

25. The decoder according to claim 24, wherein said target image includes target image lines comprising pixel positions, wherein said target image generator comprises:
a line selector, for selecting, in a first predetermined order, each target image line for re-assembly, and S sub-image lines corresponding to each selected target image line, wherein each sub-image line is associated with a different one of the S sub-images;
a pixel group selector, coupled to said line selector, for determining group numbers associated with each pixel position in the target image line, and for determining group numbers associated with each pixel in each of the S selected sub-image lines; and
a de-interleaver, coupled to said pixel group selector and said line selector, for copying, in a third predetermined order, pixels in each of the S selected sub-image lines into pixel positions in the target image line, wherein each pixel is copied into a pixel position in the target image line, and wherein the group number associated with the pixel is equal to the group number of the pixel position.

26. A selective call receiver for decoding a target image from information included in a digital radio signal, wherein the selective call receiver stores a runlength code book optimized to a predetermined resolution C, and wherein said selective call receiver comprises:
a receiver element for receiving and demodulating the information in the received digital radio signal, including an address and S facsimile encoded sub-image messages transmitted in a predetermined order;
a controller, coupled to said receiver element, for comparing the address with a predetermined address stored in the selective call receiver and further processing the information when the address compares to the predetermined address, the controller comprising;
a facsimile decoder for generating S sub-images from the S facsimile encoded sub-image messages, wherein each of the S sub-images includes sub-image lines comprising pixels, using the runlength code book;
a sub-image memory, coupled to said facsimile decoder, for storing the S sub-images;
a target image generator, coupled to said sub-image memory and said facsimile decoder, for re-assembling the target image from the S sub-images; and a target image memory, coupled to said target image generator, for storing the target image, and a display, coupled to said target image memory, for displaying the target image.

27. The selective call receiver according to claim 26, wherein S is a predetermined integer.

28. The selective call receiver according to claim 26, wherein the signal further includes a target image resolution, T, further comprising the step of receiving the target image resolution, T, in the digital radio signal.

29. The selective call receiver according to claim 26, wherein the target image resolution, T, is predetermined.

30. The selective call receiver according to claim 26, wherein the target image includes target image lines comprising pixel positions, and wherein the target image generator comprises;

a line selector, for selecting, in a first predetermined order, a target image line for re-assembly, and S sub-image lines corresponding to the target image line, wherein each sub-image line is associated with a different one of the S sub-images;

a pixel group identifier, coupled to said line selector, for determining group numbers associated with each pixel position in the target image line, and for determining group numbers associated with each pixel in each of the S sub-image lines; and a de-interleaver, coupled to said pixel group identifier and said line selector, for copying, in a third predetermined order, pixels in each of the S sub-image lines into pixel positions in the target image line, wherein each pixel is copied into a pixel position in the target image line, and wherein the group number associated with the pixel is equal to the group number of the pixel position.

31. The selective call receiver according to claim 30, wherein the target image has a target image resolution, T, wherein an interleaving ratio is equal to T/C, and wherein the pixel group identifier comprises:

a target image table generator means which generates a list of group numbers corresponding to the pixel positions in the target image line, wherein each group number in the list is an integer ceiling of a quotient of the corresponding pixel position and the interleaving ratio, T/C, and wherein group numbers of the same value which appear exactly S times in the list are identified as full groups; and a sub-image table generator means which generates a list of the group numbers corresponding to the pixels in one of the S sub-image lines which is in a predetermined one of the S sub-images by making a sequence consisting of the group numbers of the full groups, and which further generates a list of the group numbers corresponding to the pixels in S-1 sub-image lines, wherein the list consists of an arithmetic sequence of positive integers beginning with 1,2, . . . .

32. The selective call receiver according to claim 30, wherein the target image has a target image resolution, T, wherein an interleaving ratio is equal to T/C, and wherein the pixel group identifier comprises:

a target image table generator means which generates a list identifying group numbers for the pixel positions in the target image line by setting a group size, N, to the integer ceiling of the product of a scale factor, D, and the interleaving ratio, T/C, and selecting, in a second predetermined order, a plurality of groups of N contiguous pixel positions in the target image line, and associating a unique group number with each selected group of the plurality of groups of N contiguous pixels, the unique group number being associated with all the pixels within each group of the plurality of groups of N contiguous pixels; and a sub-image table generator means which generates a list, wherein the list identifies group numbers for pixels in one of the S sub-image lines by selecting a plurality of groups of N−D * (S-1) contiguous pixels in the one of the S sub-image lines in the second predetermined order, and associating a unique group number with each selected group of the plurality of groups of N−D * (S-1) contiguous pixels, the unique group number being associated with all the pixels within each group of the plurality of groups of N−D * (S-1) contiguous pixels, wherein the list further identifies group numbers for pixels in S-1 of the S sub-image lines by selecting a plurality of groups of D contiguous pixels in the S-1 of the S sub-image lines in the second predetermined order, and associating a unique group number with each selected group of the plurality of groups of D contiguous pixels, the unique group number being associated with all the pixels within each group of the plurality of groups of D contiguous pixels.

* * * * *